United States Patent [19]
Husted

[11] 4,095,849
[45] * Jun. 20, 1978

[54] TREAD FOR POWER DRIVEN SKI TYPE DEVICE

[75] Inventor: Royce H. Husted, Wheaton, Ill.

[73] Assignee: Saroy Engineering, Wheaton, Ill.

[ * ] Notice: The portion of the term of this patent subsequent to Jul. 12, 1994, has been disclaimed.

[21] Appl. No.: 790,655

[22] Filed: Apr. 25, 1977

Related U.S. Application Data

[63] Continuation-in-part of Ser. No. 599,003, Jul. 25, 1975, Pat. No. 4,035,035.

[51] Int. Cl.² ............................................. B62D 55/26
[52] U.S. Cl. ..................................... 305/35 R; 305/46
[58] Field of Search ................. 305/35 R, 35 EB, 46, 305/39, 53; 280/11.11 E, 11.1 ET; 180/9.64, 9.62, 1 G

[56] References Cited

U.S. PATENT DOCUMENTS

| | | | |
|---|---|---|---|
| 2,312,072 | 2/1943 | Broadwater | 305/35 R |
| 3,830,551 | 8/1974 | Masaoka et al. | 305/35 R |
| 3,944,296 | 3/1976 | Stampone | 305/35 R |
| 4,035,035 | 7/1977 | Husted | 305/35 R X |

Primary Examiner—Robert B. Reeves
Assistant Examiner—John P. Shannon
Attorney, Agent, or Firm—Samuel Shiber

[57] ABSTRACT

In a tread for a power-driven ski type of device having a chain with a plurality of spaced propulsion cleats, an outwardly protruding propulsion cleat, constructed with a venting passage and with resiliency to enable it to bend and thereby withstand the dynamic forces associated with its protruding construction, and to vent snow which is continuously trapped between itself and the sprockets, when the cleat swings over and around these sprockets.

10 Claims, 9 Drawing Figures

TREAD FOR POWER DRIVEN SKI TYPE DEVICE

CROSS REFERENCE TO RELATED APPLICATIONS

This application is a continuation in part of my copending application Ser. No. 599,003 filed on July 25, 1975, now U.S. Pat. No. 4,035,035 which is incorporated by reference herein.

BACKGROUND OF THE INVENTION

The present invention relates to a tread for propulsion in snow, and particularly to a tread for a power-driven ski type of device, which may be a power-driven toboggan, ski-bob, snowmobile or other light, snow going vehicle. Throughout the text I will discuss the cleat as it applies to a power-driven ski, with the understanding that similar considerations hold true in the case of other devices of this type.

Power-driven ski and ski-bob are newcomers to the small family of motorized winter sports devices, and have been described in detail in my U.S. Pat. No. 3,853,192, issued on Dec. 10, 1974, and in my U.S. Patent Application Ser. No. 754,457 filed on Jan. 6, 1977, respectively, both of which are herein incorporated by reference.

Basically, the ski is propelled by a tread which circulates around the posterior ski portion at a linear pitch-line speed which is approximately equal to the ski's ground speed, which may exceed 30 m.p.h.. The tread is circulateably supported by sprockets which are preferably small in order to keep the ski's profile compact and for other reasons discussed in my above mentioned patent. Consequently, the tread swings around the sprocket at high angular speeds, and the portions of the tread that protrude outwardly from the tread's pitch-line experience sharp inertial forces due to acceleration and deceleration of the cleat upon starting and ending, respectively, their travel over the sprocket, in addition to the centrifugal forces.

Operating a mechanical device with moving parts in snow environment poses some unique problems. Snow may readily transfer from fluffy powder to water or to hard ice, depending on the temperature and mechanical conditions it is subjected to. When the tread circulates over the sprockets it tends to accept a build up of snow which is packed, centrifugally and mechanically, between the cleats and the sprocket, until it interferes with the proper engagement between the two, often causing early mechanical failure of the tread, and in many instances of the ski posterior body portion. Therefore, it seems essential to prevent such build up of snow by preventing the entrapment of snow between the cleats and the sprockets.

Some of the objects of the present invention are to provide a propulsion cleat for the power-driven ski's tread that would withstand the inherent mechanical punishment, by being strong and flexible simultaneously, while at the same time effectively providing a forward thrust to the ski. A further object is to minimize the cleat's weight so as to minimize the centrifugal and inertial forces previously mentioned.

DETAILED DESCRIPTION OF THE FIGURES

Figure 1:
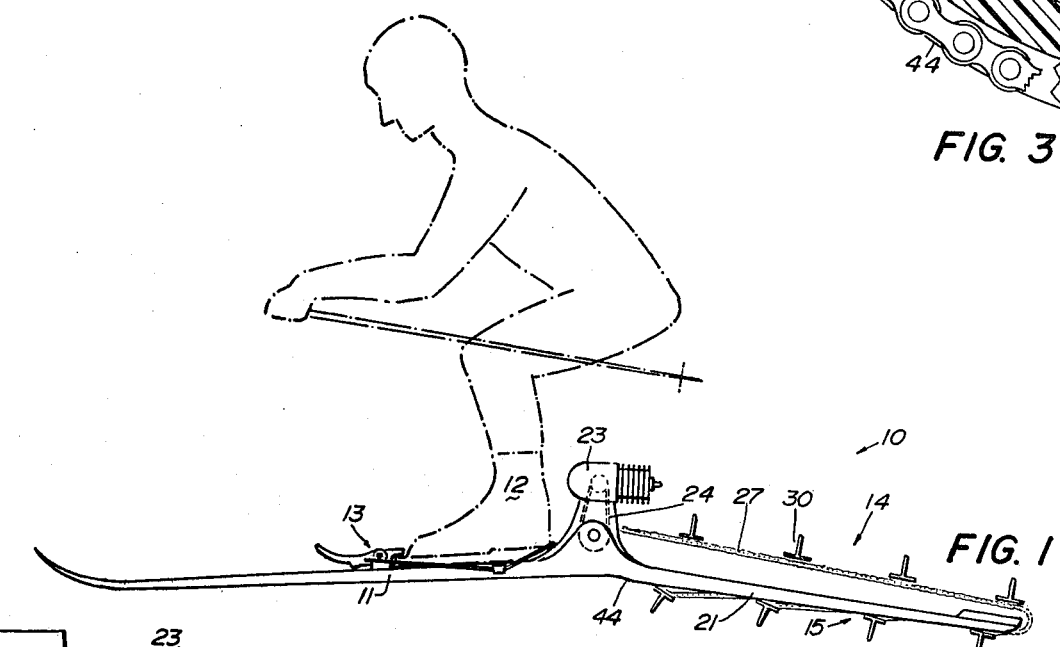
FIG. 1 is a general side view of a skier using a power-driven ski.

FIG. 1 is a general side view of a skier using a power-driven ski 10 having an anterior ski portion 11 to which a skier's boot 12 is attahced by a conventional binding mechanism 13, and a posterior ski portion 14 around which a propulsion tread 15 is circulateably supported by an idler sprocket 16 and a drive sprocket 17. (Throughout the FIGS. same parts will be indicated by same numerals.) The idler sprocket 16 is circulateably supported through a shaft 18 by a piston 19 which is slidingly supported, in a cylinder 20 formed at the rear end of the body 21 of the posterior portion 14, by a helical compression spring 22 which is shown in a fully compressed position in FIG. 2. A light weight internal combustion engine 23 drives the tread 15 through a chain 24 which transmits power to a drive shaft 25 to which the drive sprocket 17 is coupled through a one-way clutch mechanism 26 formed in its hub (note FIGS. 3 & 4). Further details regarding the power-driven ski per se, are available in my previously mentioned patent and patent application.

Figure 5:
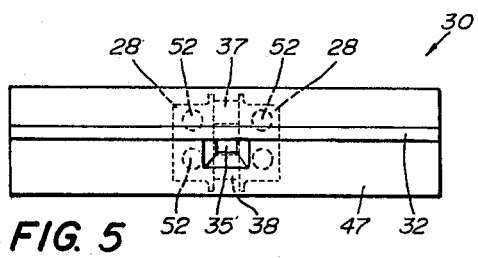
FIG. 5 shows an embodiment of a propulsion cleat, as viewed from its snow engaging side.
Figure 6:
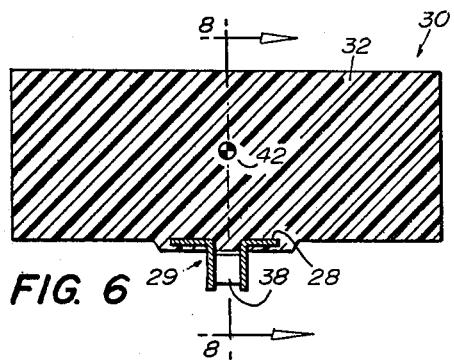
FIG. 6 shows a sectional rear view of the cleat of FIG. 5.
Figure 7:
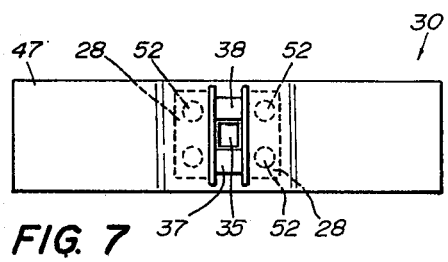
FIG. 7 shows the cleat of FIG. 5 as viewed from its sprocket engaging side.

The tread 15 has an endless linked chain 27 which is supported on the sprockets 16 & 17, and a plurality of spaced propulsion cleats 30. Each of the cleats 30 has a snow engaging side (note FIG. 5), opposite from a sprocket engaging side (note FIG. 7).

Noting the various FIGS, it can be seen that the propulsion cleat 30 comprises;

a cleat attachment link 29 which forms a part of the chain 27 and has an attachment plate 28, a snow engaging section 31 made of a resilient material attached to the plate 28 and having a roof-plate 47 integral with a protruding blade 32 on the snow engaging side for engaging snow and developing thrust against it.

A venting passage 35 has an increasing cross sectional area as it progresses from the sprocket engaging side to the snow engaging side, to assure that snow and other debris that have been forced into its narrower opening will be able to continue through the venting passage 35. This last feature is noted on FIG. 8 by the angle 36. Without the benefit of the venting passage snow tends to pack between rollers 37 & 38 and prevents the cleat 30 from properly meshing with the sprockets 16 & 17 when the cleat rides over the sprocket. Specifically, when the tread advances to engage a snow packed attachment link with the sprocket, it rides up on the tip of a tooth 39 of the sprocket (due to the entrapped snow), over-tensioning the chain all around, overstressing the rollers 37 & 38, the sprocket tooth 39, and the links adjacent to the attachment link, which also mesh improperly with the sprockets 16 & 17. Further, when the attachment link moves from over the sprocket into a groove 40 formed in the body 21 after riding the tooth tip, it drops into it (instead of smoothly moving into), hammering and often breaking, the body 21. The vent passage 35 opens, at the snow engaging side of the cleat, behind the protruding blade 32 so that it is sheltered by it from the snow that is being packed into the cleat, on the front side of the protruding blade 32, as the cleat thrusts against the snow.

Figure 4:
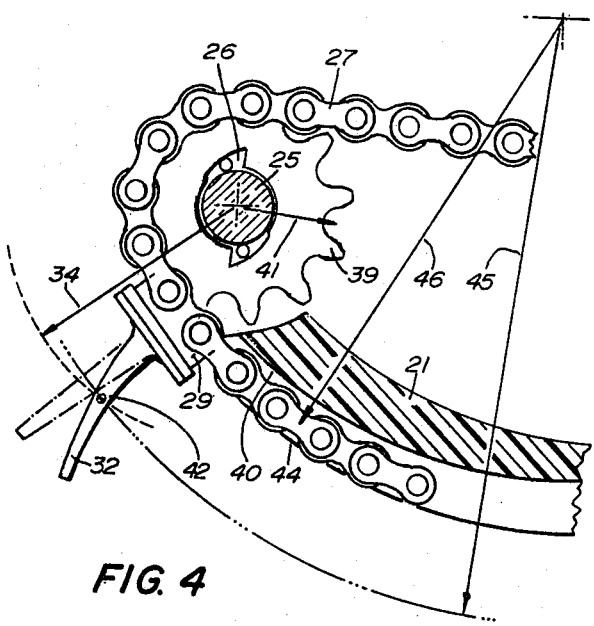
FIG. 4 is a side view of the drive sprocket area of the power-driven ski, showing a propulsion cleat ending its swing over and around the drive sprocket.
Figure 3:
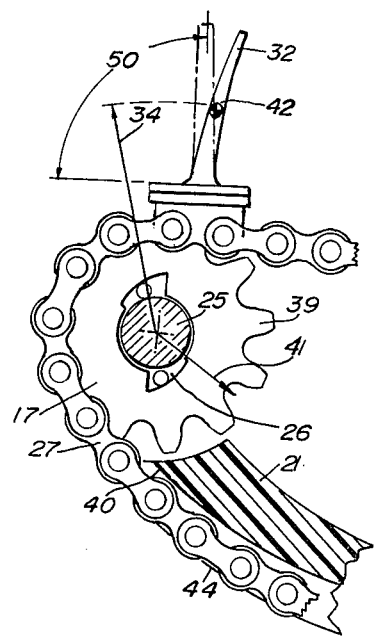
FIG. 3 is a side view of the drive sprocket area of the power-driven ski, showing a propulsion cleat starting its swing over and around the drive sprocket.

As the cleat starts to swing over and around the sprocket 17, the center of gravity 42 of its protruding blade accelerates from a velocity "v", equalling "$SxR_{41}$", to a velocity "V", equalling "$SxR_{34}$", where "S" is the angular velocity of the sprocket 17, "$R_{41}$" (indicated by numeral 41) is the pitch-line radius of sprocket 17, and "$R_{34}$" (indicated by numeral 34) is the radius of the trajectory of the center of gravity 42 as it swings around the sprocket 17 (note FIGS. 3 & 4). If the cleat 30 would have been rigid, then the acceleration rate would have been extremely high, resulting in a destructive shock developing between the cleat and the sprocket. However, due to the resilient construction and bendability of the protruding blade 32, first the protruding blade 32 is allowed to swing backwards, as shown in FIG. 3 in solid lines, and then, gradually, to straighten to its normal position, shown in phantom lines on FIGS. 3 & 4, thereby reducing the acceleration rate several folds, and second, limiting the maximum shock force that the protruding blade 32 can impose on the other parts of the cleat in reaction to its acceleration.

As the cleat ends its travel over the sprocket 17 (note FIG. 4), and starts its travel over an arched ramp 44 in a groove 40, the velocity of the center of gravity 42 is reduced from "V" to "$v_{arc}$", where "$v_{arc}$" equals "$vxR_{45}R_{46}$", where "$R_{45}$" (indicated by numeral 45) is the radius of the trajectory of the center of gravity 42 when the cleat moves over the ramp 44, and "$R_{46}$" (indicated by numeral 46) is the radius of the pitch-line of the chain 27 when it travels over the ramp 44. At this point, if the cleat 30 was rigid, the decelerating protruding blade 32 would have urged the attachment link to swivel, thrusting its front part on into the groove 40, and generating a destructive shock therein between. However, here too, due to the resiliency of the protruding blade 32, first the deceleration rate of the protruding blade 32 is reduced, and second the resilient connection both limits the forces transmitted to the attachment link and absorbs the motion, as shown in FIG. 4 in solid lines (the normal position of the protruding blade is shown in phantom lines). In a similar manner the resilient connection prevents destructive shocks from developing between the attachment link 29 and the sprocket 16 and the ski body 21, when the protruding blade 32 accelerates and decelerates over the sprocket 16.

FIGS. 5, 6, 7 and 8 are views of the embodiment 30 from the snow engaging side, from the rear, from the sprocket engaging side and from the side, respectively. The embodiment comprises the attachment link 29, shown separately in FIG. 9, which is a slightly modified commercially available roller chain attachment link, having an attachment plate 28 defining four round perforations 52. The snow engaging section is made of a resilient material, preferably polyurethane, having a hardness of approximately 42 shore on a "D" scale, which is molded directly onto the attachment plate 28, partially encapsulating it and thereby adhering to it, and mechanically connecting and bridging itself through the perforations 52. The venting passage 35 widens towards the snow engaging side as marked by angle 36.

The snow engaging section of the cleat 30 is substantially wider than the attachment plate 28, and its stiffness decreases with distance from the attachment plate 28 so that when the protruding portion is subjected to a bending force in the course of its normal thrusting against snow or when it accidentally hits a hard object (a stone for example), the resulting bending stresses which develop therein do not drastically concentrate at any particular cross section of the cleat.

As previously mentioned, polyurethane material with shore hardness of approximately 42 on the "D" scale (which may be as high as 47 for cleats that are intended for operation at relatively higher temperatures, that is, about +20°F, and as low as 37 for cleats intended to operate at temperatures below −10°F) is a recommended material since it combines excellent wear resistance, impact and tear resistance and is suitable for most operating conditions.

Figure 2:
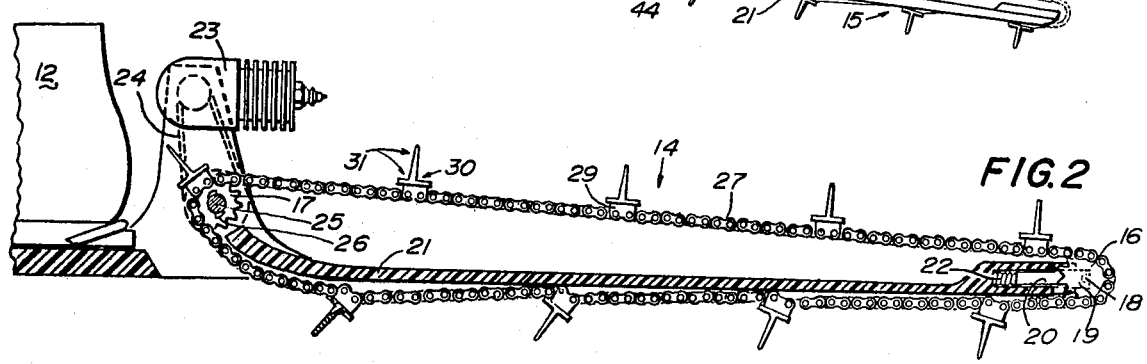
FIG. 2 is a sectional side view of the posterior portion of the power-driven ski.
Figures 8, 9:
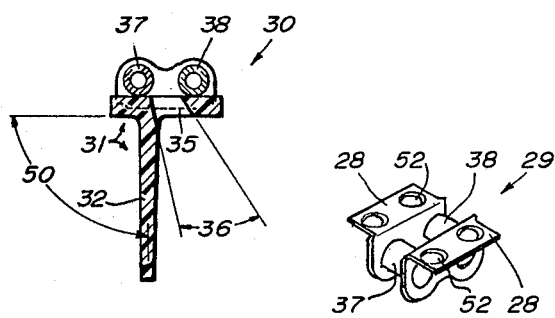
FIG. 8 shows a sectional side view of the cleat of FIG. 5, sectioned along line 8—8 marked on FIG. 6.
FIG. 9 shows a separate attachment link which forms a part of the cleat of FIG. 5.

To improve the bite of the cleat in the snow and compensate for the protruding blade's tendency to incline backwards, as illustrated in FIGS. 1 & 2 an angle 50, marked on FIGS. 3 and 8, can be made less than 90°.

It is advantageous to construct the tread in general, and the cleat and its snow engaging section in particular, to be as light as possible, since this minimizes the source of the destructive inertial forces previously discussed.

While the present invention has been illustrated by a single embodiment, it is understandable that modifications and substitutions can be made by one skilled in the art, without departing from the spirit of the invention or the scope of the claims.

I claim:

1. In a power driven ski type of a device using a tread of the type having an endless linked chain adapted to circulate over a sprocket and a plurality of spaced propulsion cleats, each of said cleats having a snow engaging side opposite from a sprocket engaging side, a propulsion cleat comprising in combination;

a cleat attachment link adapted to form a part of said chain and having an attachment plate, and a snow engaging section made of a resilient material attached to said attachment plate and having a roof-plate integral with a protruding blade, wherein said protruding blade is resiliently connected to said attachment link, for preventing the creation of a destructive shock by said protruding blade between said attachment link to said sprocket and said power driven ski type of a device, when said protruding blade accelerates and decelerates over said sprocket.

2. A propulsion cleat as in claim 1, wherein said snow engaging section is molded directly onto said attachment plate.

3. A propulsion cleat as in claim 2, wherein said attachment plate is perforated, and said snow engaging section forms a mechanical connection between itself and said attachment plate through said perforation.

4. A propulsion cleat as in claim 1, wherein said snow engaging section is substantially wider than said attachment plate, and its stiffness decreases with distance from said attachment plate.

5. A propulsion cleat as in claim 1, wherein said snow engaging section is made of a polyurethane material with a shore hardness of 37 to 47 on a "D" scale.

6. A tread having a plurality of cleats attached to a chain, for a power driven ski type of a device, comprising in combination:

said chain, adapted to circulate over a sprocket, and containing a plurality of cleat's attachment links, each of said links having an attachment plate, a snow engaging section made of a resilient material attached to said attachment plate and having a roof-plate integral with a protruding blade, wherein said protruding blade is resiliently connected to said attachment link, for preventing the creation of a destructive shock by said protruding blade between said attachment link to said sprocket and said power driven ski type of a device, when said protruding blade accelerates and decelerates over said sprocket.

7. A propulsion cleat as in claim 6, wherein said snow engaging section is molded directly onto said attachment plate.

8. A propulsion cleat as in claim 7, wherein said attachment plate is perforated, and said snow engaging section forms a mechanical connection between itself and said attachment plate through said perforation.

9. A propulsion cleat as in claim 6, wherein said snow engaging section is substantially wider than said attachment plate, and its stiffness decreases with distance from said attachment plate.

10. A propulsion cleat as in claim 6, wherein said snow engaging section is made of a polyurethane material with a shore hardness of 37 to 47 on a "D" scale.

* * * * *